(12) United States Patent
Pavlovic et al.

(10) Patent No.: US 7,423,547 B2
(45) Date of Patent: Sep. 9, 2008

(54) SYSTEM AND METHOD FOR VERIFYING ASSEMBLY OF MANUFACTURED PARTS USING RFID TAGS

(75) Inventors: Slobadan Pavlovic, Canton, MI (US); David Menzies, Clawson, MI (US)

(73) Assignee: Lear Corporation, Southfield, MI (US)

( * ) Notice: Subject to any disclaimer, the term of this patent is extended or adjusted under 35 U.S.C. 154(b) by 160 days.

(21) Appl. No.: 11/162,957

(22) Filed: Sep. 29, 2005

(65) Prior Publication Data

US 2007/0069909 A1 Mar. 29, 2007

(51) Int. Cl.
*G08B 21/00* (2006.01)
(52) U.S. Cl. ................. 340/687; 340/686.1; 340/686.2; 340/686.4
(58) Field of Classification Search ................. 340/687, 340/686.1, 686.2, 686.4
See application file for complete search history.

(56) References Cited

U.S. PATENT DOCUMENTS

| | | | |
|---|---|---|---|
| 5,647,754 A | 7/1997 | Kohno | |
| 5,647,757 A | 7/1997 | Chrysostomou | |
| 5,963,144 A | 10/1999 | Kruest | |
| 6,094,793 A * | 8/2000 | Szuba | 29/33 P |
| 6,276,953 B1 | 8/2001 | Gauker et al. | |
| 6,361,356 B1 | 3/2002 | Heberlein et al. | |
| 6,435,894 B2 | 8/2002 | Little et al. | |
| 6,811,424 B2 | 11/2004 | Seminara et al. | |
| 6,847,856 B1 | 1/2005 | Bohannon | |
| 6,863,220 B2 | 3/2005 | Selker | |
| 6,881,082 B2 | 4/2005 | Jordan et al. | |
| 6,968,994 B1 | 11/2005 | Smith | |
| 7,042,346 B2 * | 5/2006 | Paulsen | 340/438 |
| 2003/0132301 A1 | 7/2003 | Selker | |
| 2005/0009391 A1 | 1/2005 | Jordan et al. | |

FOREIGN PATENT DOCUMENTS

| | | |
|---|---|---|
| DE | 42 40 628 | 6/1994 |
| DE | 10 2004 004 022 | 8/2005 |
| EP | 1 523 158 A1 | 4/2005 |
| WO | WO 2007/016956 | 2/2007 |

* cited by examiner

*Primary Examiner*—Daryl C Pope
(74) *Attorney, Agent, or Firm*—Brooks Kushman P.C.

(57) ABSTRACT

A system for verifying that parts are properly assembled. A radio frequency identification (RFID) tag is connected to one of the parts that has an antenna loop. The antenna loop has two spaced contacts that may be bridged by a shorting bar on the other one of the parts. When the parts are properly assembled and the shorting bar bridges the contacts, the RFID tag is enabled to communicate a coded signal to a receiver thereby determining that the parts are assembled.

13 Claims, 5 Drawing Sheets

SYSTEM AND METHOD FOR VERIFYING ASSEMBLY OF MANUFACTURED PARTS USING RFID TAGS

BACKGROUND OF THE INVENTION

1. Field of the Invention

The present invention relates generally to the field of Radio Frequency Identification (RFID) systems.

2. Background Art

Radio frequency identification (RFID) is a wireless form of identification technology that allows for reading of data from an object bearing an RFID tag. RFID tags are used to identify objects in manufacturing and service environments. An RFID system includes a tag and a reader. The reader is also referred to as an interrogator or receiver. The reader is designed to receive and transmit electromagnetic waves to generate an electromotive field (EMF). The tag, commonly referred to as an RFID tag, has a transponder and either a wound antenna or printed antenna. The tag may be either of an electromagnetic induction type or an electromagnetic coupling type. Both types of tags are designed to communicate with the reader in a non-contact manner.

The antenna of the tag picks up signals from and sends signals to a reader. The reader typically contains a radio frequency (RF) transceiver. If the transceiver is triggered, the reader's transceiver generates an electromotive field (EMF) that is directed towards the RFID tag. The electromotive field is often called an interrogation signal or a carrier signal. In a passive RFID tag system, the electromotive field supplies power to the antenna to generate an activation signal. The activation signal is used to energize the RFID tag's transponder. In response to the activation signal, the RFID tag responds by sending a coded signal back to the RFID reader containing information stored and/or modulated by the transponder. The RFID reader detects the coded signal and the coded signal can be used to convey instructions and other information.

An RFID tag can be either an active tag, a passive tag, or a semi-passive tag. Active tags typically transmit continuously or periodically. Active tags are battery powered. Passive tags transmit in response to an interrogation signal generated by the reader. Semi-passive tags are a hybrid of active tags and passive tags. Semi-passive tags use a battery to run the circuits of the chip, but communicate by drawing power from the electromotive field generated by the reader.

One example of an electronic identification system is described in U.S. Pat. No. 6,847,856. This invention requires multiple RFID tags that are used to determine proper connectivity or alignment between physical components.

There is a need to accurately determine the connectivity and/or the proper assembly of physical components during manufacturing and servicing of the physical components. Additionally, there is a need to interrogate and verify the proper assembly of components in manufacturing systems in a relatively inexpensive and streamlined manner. Furthermore, there is a need for tag devices capable of providing reliable information associated with a physical component such as the final mating position, serial number, model number, lot number, test report, test instruction, and maintenance record instruction, etc. One way of determining the connectivity of and/or the proper alignment of physical components is with an electronic identification system such as a radio-frequency identification (RFID) system. RFID systems can be used to identify, locate and track objects using wireless radio signaling in a reliable, accurate, real-time manner.

SUMMARY OF THE INVENTION

One aspect of the present invention is to provide an improved assembly verification system using radio frequency identification (RFID). Another aspect of the present invention is to provide a method for verifying whether two or more manufactured parts are in an assembled position or in an unassembled position using RFID technology.

According to one embodiment of the invention, a RFID tag of the assembly verification system has an antenna loop for receiving an electromotive field (EMF). The antenna loop defines at least a portion of a switch that is attached to one of the two or more manufactured parts. The switch has a closed position corresponding to the position of the manufactured parts in an assembled position and an open position corresponding to the manufactured parts being in an unassembled condition. When the switch is in the closed position, the antenna loop provides an activation signal. The system also includes a transponder to receive the activation signal and provide a coded signal to the antenna. When the switch is closed, the antenna sends the coded signal to a receiver to indicate that the manufactured parts are in the assembled position. The RFID tag is connected to one of the manufactured parts. The RFID tag may be a passive tag.

According to other aspects of the assembly verification system, the transponder has a memory that stores information which may include a product identification number, serial number, model number, lot number, test report, warranty information, test instruction, maintenance record instruction and/or position information. Furthermore, the switch may include a shorting bar and at least two contact pads. The contact pads are located in the antenna loop that is on a second of the manufactured parts. The shorting bar is located on one of the manufactured parts to complete the antenna loop when it contacts the two contact pads. The manufactured parts of the assembly verification system may accommodate the substitution of a replacement part to replace a previously assembled manufactured part. In one example, the manufactured parts may also include a fuse and a fuse box.

In carrying out the above aspects and other aspects of the present invention, a method is provided for verifying whether two or more manufactured parts are in an assembled position or in an unassembled position using RFID. The method includes the steps of generating an electromotive field (EMF) in and around one of the manufactured parts. The EMF is received by an antenna having at least a portion of a switch attached to one of the manufactured parts. The switch may be in either an open position or a closed position. The switch may be in the open position when the manufactured parts in an unassembled position. The switch may be in the closed position when the manufactured parts are in an assembled position. The antenna is intended to provide an activation signal when the parts are assembled. The activation signal is provided to a transponder when the manufactured parts are in the assembled position. A coded signal is provided from the transponder to the antenna. The coded signal is received from the antenna by a receiver. The switch is determined to be in the open or the closed position based on the reception of the coded signal. An alert signal may be communicated when it is determined that one of the manufactured parts is in the unassembled position.

Another aspect of the present invention relates to providing a circuit for verifying whether two or more objects are in a first position or a second position. The antenna loop of the invention is disposed on one of the objects to receive an electromotive field (EMF). The antenna loop defines spaced contacts on one of the objects. A conductor may be positioned to complete the antenna loop by bridging the two contacts or the conductor may be separated from one or both of the contacts to interrupt of the antenna loop. The contacts may be disposed on a second of the objects, such that the conductor closes the contacts only when the objects are in the first position and the antenna receives the EMF. The circuit also has a transponder operatively connected to the antenna loop to receive the activation signal and provide a coded signal to the antenna. The coded signal provided to the antenna indicates that the objects are in the first position.

According to other aspects of the invention, the circuit may include a plurality of sets of contacts on several objects that are closed by a plurality of conductors. The contacts may be connected in series or parallel.

These and other objects, features and advantages of the present invention will be readily apparent from the following detailed description of the best mode for carrying out the invention when taken in connection with the accompanying drawings.

DETAILED DESCRIPTION OF THE PREFERRED EMBODIMENT(S)

Figure 1:
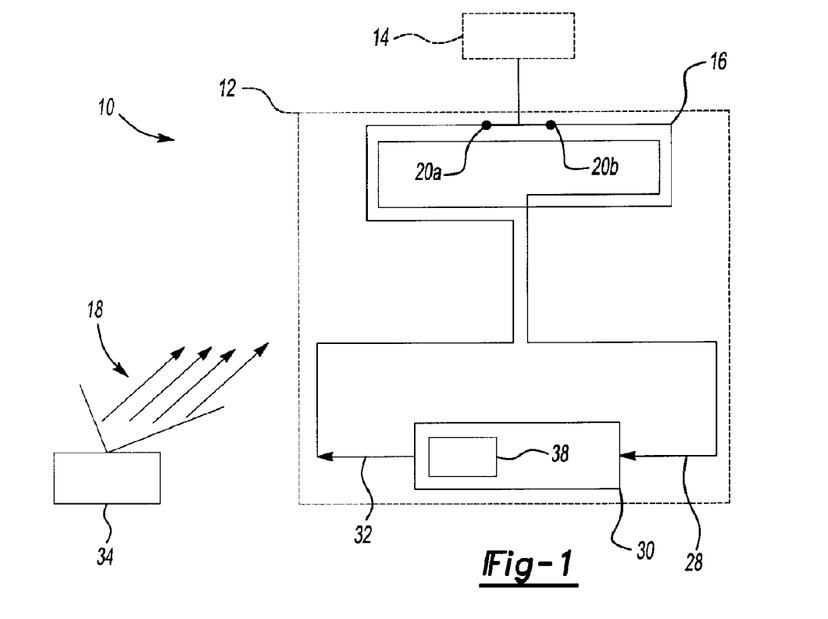
FIG. 1 is a schematic diagram of an assembly verification system illustrating an antenna, a switch, a transponder, and a receiver.
Figures 2A, 2B:
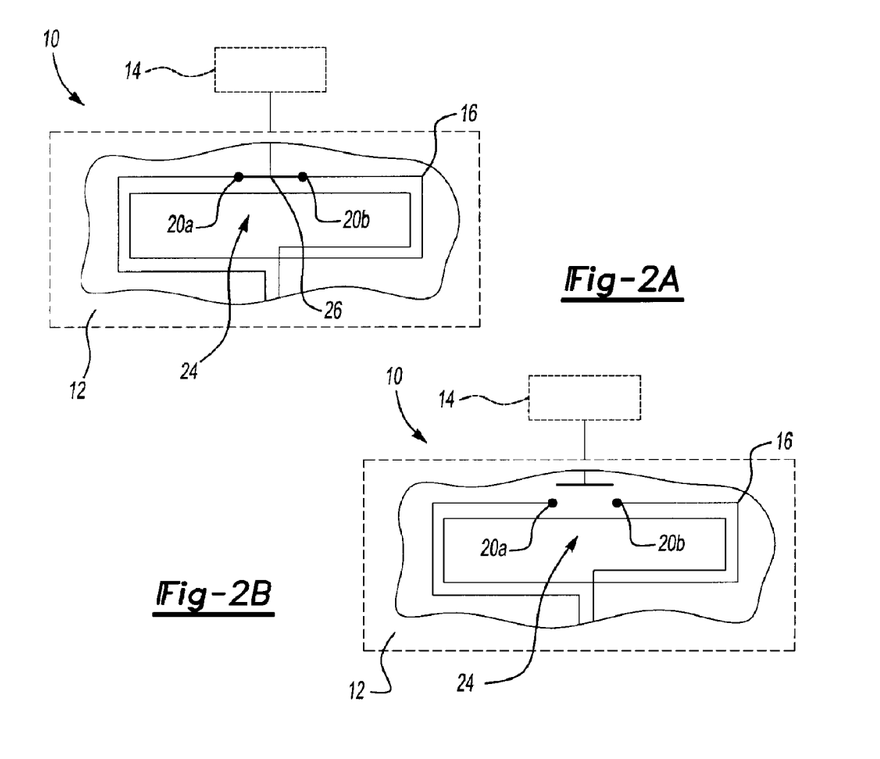
FIGS. 2A and 2B are schematic diagrams illustrating two parts in an assembled position (FIG. 2A) and an unassembled position (FIG. 2B)

Referring to FIGS. 1, 2A and 2B, an assembly verification system constructed in accordance with the invention is generally referred to by reference numeral 10. FIG. 2a shows the system 10 in an assembled position and FIG. 2b shows the system 10 in an unassembled position. A first manufactured part 12 and a second manufactured part 14 are designed to be assembled together which can be verified by the system 10.

The system 10 has an antenna loop 16 that may receive an electromotive field (EMF) 18. The antenna loop 16 has at least two contact points 20a and 20b that together define a first portion of a switch 24. The first portion of the switch 24 is attached to the first manufactured part 12. A second portion of switch 24 may comprise a shorting bar 26. The shorting bar 26 is a conductive member that is positioned to bridge the two contact points 20a and 20b when the parts 12 and 14 are in an assembled position. The shorting bar 26 does not bridge the contact points 20a and 20b when the parts 12 and 14 are unassembled.

The switch 24 has an open position shown in FIG. 2b and a closed position shown in FIG. 2a. The open position is the condition of the switch 24 when the manufactured parts 12 and 14 are in an unassembled position. The closed position is the condition of the switch 24 when the manufactured parts 12 and 14 are in the assembled position. The antenna loop 16 is enabled to provide an activation signal 28 when the parts 12 and 14 are assembled and the switch 20 is in the closed position. The system 10 includes a transponder 30 that receives the activation signal 28 and provides a coded signal 32 to the antenna loop 16. The antenna loop 16 provides the coded signal 32 to a receiver 34 to indicate that the manufactured parts 12 and 14 are in the assembled position.

With continuing reference to FIG. 1, the transponder 30 may include a memory 38 for storing a wide variety of information. Examples of the type of information that may be stored include a product identification number, a serial number, a model number, a lot number, test report information, warranty information, test instruction, maintenance records, or position information.

The contact points 20a and 20b are constructed to receive the shorting bar 26 when the parts 12 and 14 are in the assembled position. The contact points 20a and 20b are in the antenna loop 16 and are located on the first manufactured part 12. The shorting bar 26 is located on the second manufactured part 14 and when the switch is closed, the shorting bar 26 completes the antenna loop 16. Manufactured parts 12 and 14 may be replaced by a replacement part of the same or similar design that may include one of the portions of the switch in the system 10.

Figure 3:
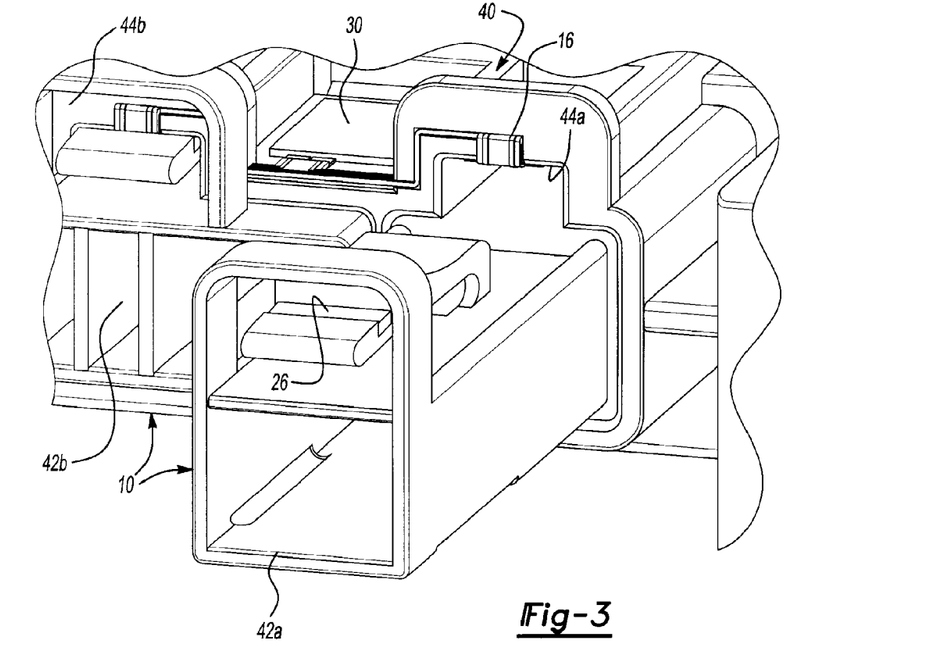
FIG. 3 is a fragmentary perspective view of a fuse and a fuse box that are provided with the assembly verification system.
Figure 4:
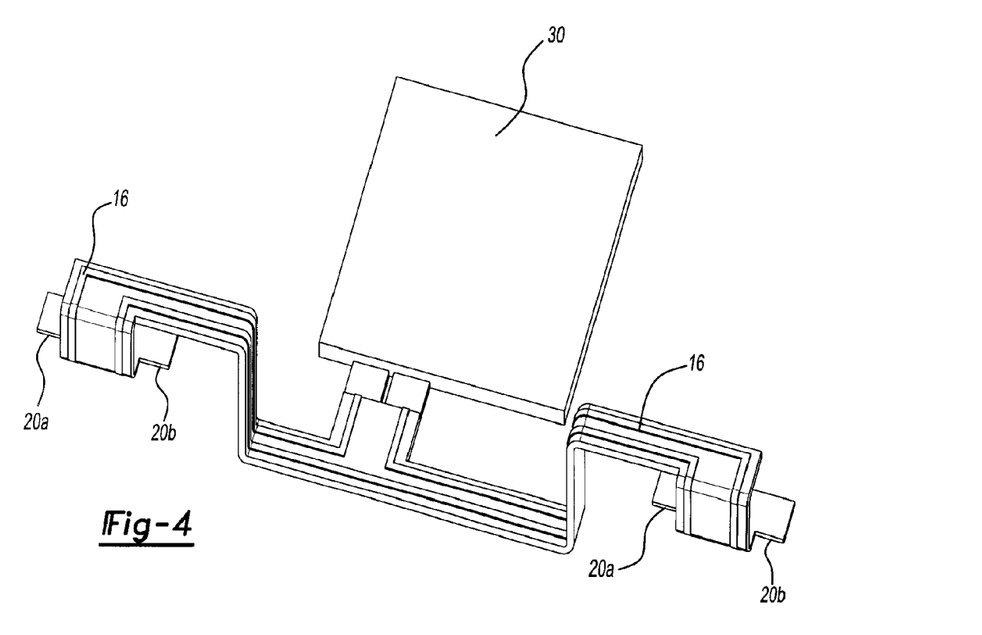
FIG. 4 is a perspective diagrammatic view of the antenna and transponder of the assembly verification system.

Referring to FIGS. 3 and 4, an example of one application of the present invention is illustrated in the context of a fuse box 40 that is adapted to receive a fuse 42. The transponder 30 is attached to the fuse box 40 with its antenna loop 16 extending to two fuse receptacles 44a and 44b. In FIG. 3, one fuse 42a is shown ready to be inserted into the receptacle 44a. Another fuse 42b is shown fully inserted in the receptacle 44b. The antenna loop 16 is interrupted at one point in each of the receptacles 44a and 44b and is preferably provided with contact points 20a and 20b. A shorting bar 26a is provided on fuse 42a. Another shorting bar 26b is provided on fuse 42b. In the unassembled condition represented by fuse 42a, the shorting bar 26a does not bridge the contacts 20a and 20b in the receptacle 44a. The shorting bar 26b of fuse 42b is shown bridging the contacts 20a and 20b in receptacle 44b. When both of the fuses 42a and 42b are fully inserted into the receptacles 44a and 44b, the shorting bars 26a and 26b function to complete the antenna loop and make the transponder 30 fully functional and capable of communicating with the receiver 34. In this embodiment, if one of the fuses 42a or 42b is not fully inserted into its respective receptacle 44a and 44b, the antenna loop will be incomplete and incapable of communicating with the receiver 34.

Figure 5:
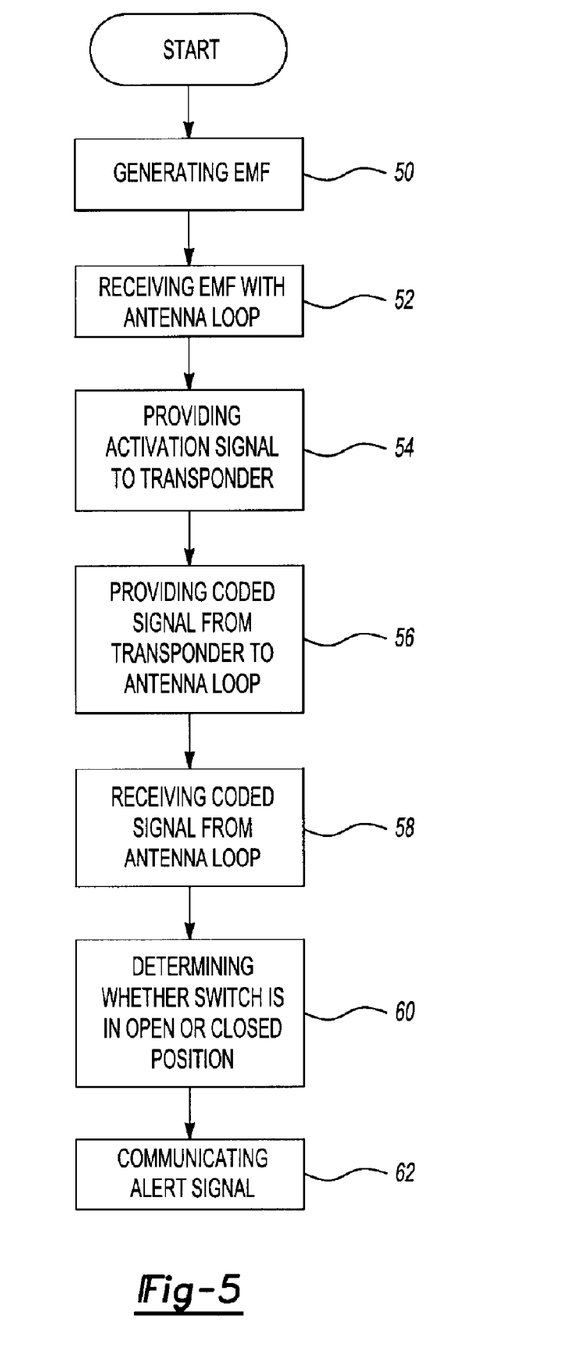
FIG. 5 is a flowchart illustrating one embodiment of a method of implementing the assembly verification system.

FIG. 5 is a flowchart that illustrates one version of the method of the present invention. More specifically, the method for verifying whether the two or more manufactured parts 12 and 14 are in their assembled position or their unassembled position. Block 50 represents generating the electromotive field (EMF) 18 in and around the manufactured parts 12 and 14. Block 52 represents the EMF 18 being received by the antenna loop 16. Antenna loop 16 has at least one set of contact points 20a and 20b that comprise a first portion of the switch 24 that is attached to one of the manufactured parts. In block 54, the activation signal 28 is provided to transponder 30 when the manufactured parts 10 are in the assembled position 12. Next, in block 56, the coded signal 32 is communicated from transponder 30 to antenna loop 16. In block 58, the coded signal 32 is transmitted from antenna loop 16 to the receiver 34. Block 60 represents the step of determining whether the switch 24 is in the open position or the closed position. The closed position 26 is indicated based upon the reception of the coded signal 32. In block 62, the step of communicating an alert signal or other verification message is provided when the manufactured parts 12 and 14 are in one of either the assembled position or the unassembled position.

Figure 6:
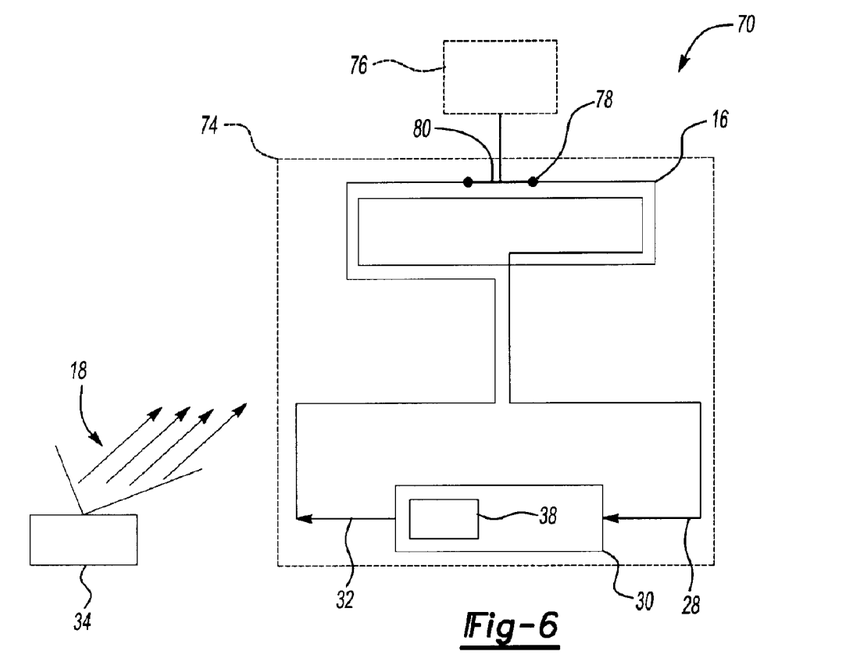
FIG. 6 is a schematic diagram of another embodiment of an assembly verification system for verifying whether two or more objects are in a first position or a second position.

Referring to FIG. 6, a circuit 70 constructed in accordance with the invention is shown to include antenna loop 16 that is disposed to receive an electromotive field (EMF) 18. The circuit 70 verifies whether first and second objects 74 and 76 are in a first position or a second position. Antenna loop 16 has two or more contacts 78 that are located on the first object 74. The contacts 78 may be closed by a conductor 80 disposed on the second object 76 such that the conductor 80 closes the antenna loop 16 only when the objects 74, 76 are in the first position. When the conductor 80 closes the contacts 78, the antenna loop 16 is completed which provides a positive indication that the first object 74 and the second object 76 are in the first position. When the conductor 80 opens the contacts 78, the antenna loop 16 is opened which indicates the first object 74 and the second object 76 are in the second position. When the objects 74, 76 are in the first position and antenna loop 16 receives the EMF 18, the activation signal 28 is enabled. Transponder 30 is operatively connected to antenna loop 16 to receive the activation signal 28. Transponder 30 can then provide the coded signal 32 to antenna loop 16. When the coded signal 32 is provided to the antenna loop 16, the objects 74, 76 are confirmed to be in the first position.

The circuit 70 may be used in a wide range of applications. For example, the circuit could be applied in a hospital to monitor intravenous medication systems. A solution bottle could be the first object 74 with the second object 76 being the hanger or receptacle for the first object. The bottle, or first object 74, could be suspended with a spring-like mechanism that would hold the contacts 78 and conductor apart until the weight of the bottle and its contents drop below a predetermined level at which point the conductor 80 would bridge the contacts 78. At this point, the antenna loop 16 would be completed and transponder 30 would be able to send a signal to the receiver 34 in a nursing station that would provide an alert to the staff who would then know that the bottle must be replaced.

Figure 7:
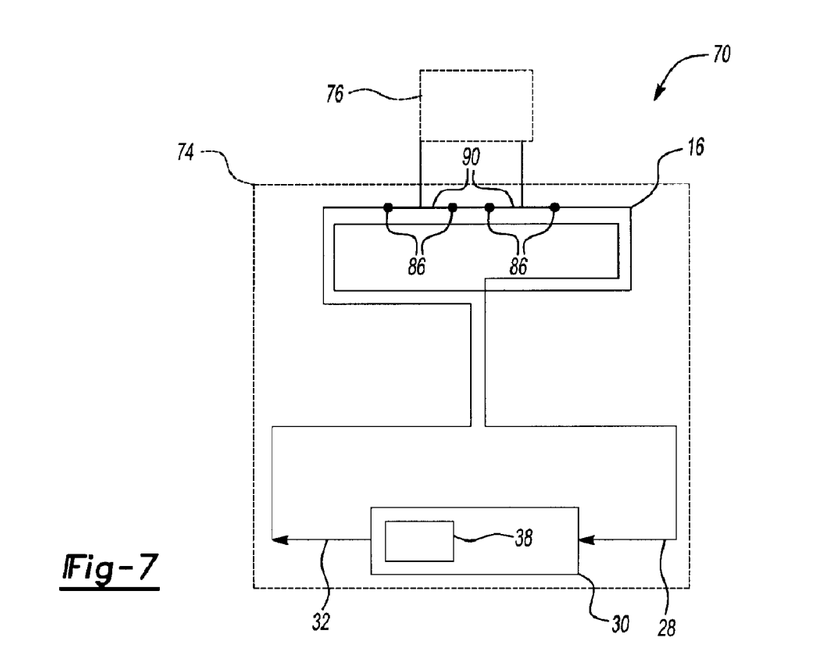
FIG. 7 is a schematic diagram of another embodiment of an assembly verification system that has a plurality of contacts connected in series.
Figure 8:
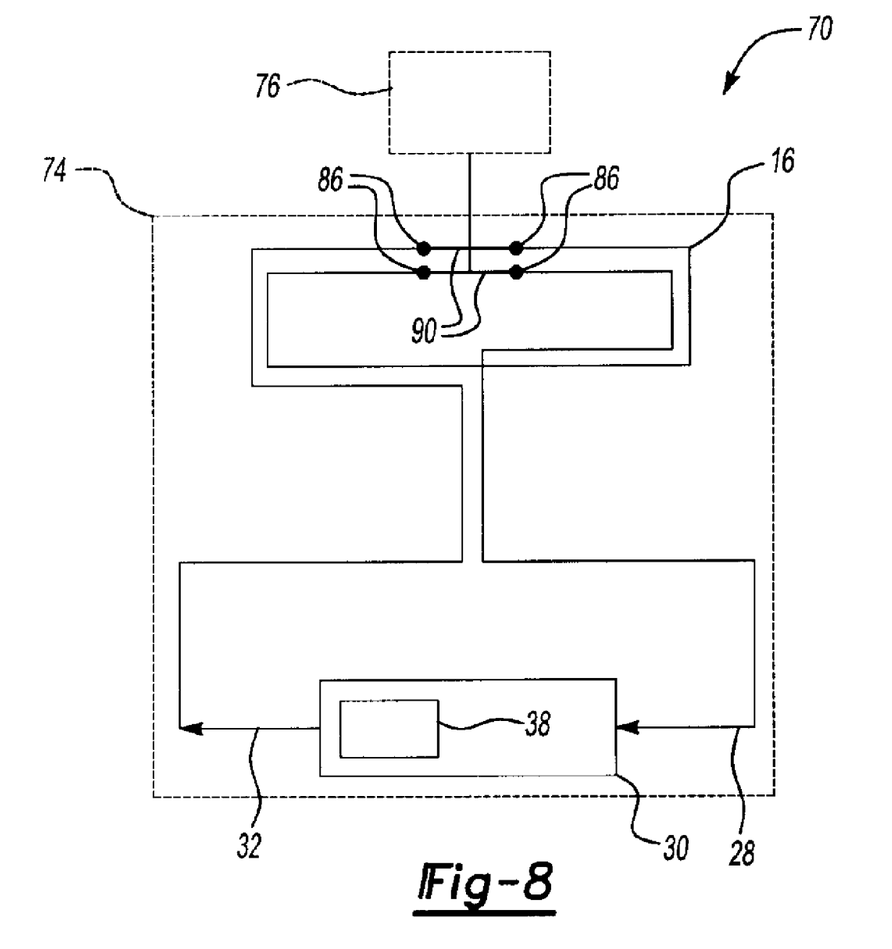
FIG. 8 is a schematic diagram of another embodiment of an assembly verification system that has a plurality of contacts connected in parallel.

With reference to FIGS. 7 and 8, the circuit 70 may have a plurality of contacts 86 on a plurality of objects 74, 76 that are closed by a plurality of conductors 90. The contacts 86 of the circuit 70 may be connected in series as shown in FIG. 7. The contacts 86 of the circuit 70 may also be connected in parallel, as shown in FIG. 8. Parallel contacts 86 may be required in grounded antenna circuits.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A radio frequency identification (RFID) system for verifying whether two or more manufactured parts are in an assembled position or in an unassembled position, the system comprising a RFID tag that includes:
    an antenna loop receives an electromotive field (EMF), the antenna loop defining at least a portion of a switch that is attached to one of the manufactured parts, the switch having a open position corresponding to the manufactured parts in an assembled position and a closed position corresponding to the manufactured parts in an unassembled position, wherein the antenna loop provides an activation signal when the switch is in the closed position; and
    a transponder receives the activation signal and provides a coded signal to the antenna that is provided to a receiver to indicate that the manufactured parts are in the assembled position.

2. The system of claim 1 wherein the REID tag is a passive REID tag.

3. The system of claim 1 wherein the antenna loop sends the coded signal to the receiver for determining whether the switch is in the closed position.

4. The system of claim 1 wherein the transponder has a memory that stores information selected from the group consisting of a product identification number, serial number, model number, lot number, test report, warranty information, test instruction, maintenance record instruction and position information.

5. The system of claim 1 wherein the switch further comprises a shorting bar on the one of the manufactured parts and at least two contact pads in the antenna loop on a second of the manufactured parts, wherein the shorting bar may complete the antenna loop.

6. The system of claim 1 wherein the one of the manufactured parts is a replacement part used to replace a previously manufactured part.

7. The system of claim 1 wherein the one of the manufactured parts is a fuse and the second of the manufactured parts is a fuse box.

8. A method for verifying whether two or more manufactured parts are in an assembled position or in an unassembled position using radio frequency identification (RFID), the system comprising:
    generating an electromotive field (EMF) in and around one of the manufactured parts;
    receiving the EMF with an antenna having at least a portion of a switch wherein the portion is attached to one of the manufactured parts, the switch having an open position corresponding to the manufactured parts in an assembled position and a closed position corresponding to the manufactured parts in an unassembled position, the antenna providing an activation signal when the switch is in the closed position;
    providing the activation signal to a transponder when the manufactured parts are in the assembled position;
    providing a coded signal from the transponder to the antenna;

receiving the coded signal from the antenna by a receiver; and determining whether the switch is in an open or closed position based on the reception of the coded signal.

9. The method of claim 8 further comprising the step of communicating an alert signal when it is determined that one of the manufactured parts is in the unassembled position.

10. A circuit for verifying whether two or more objects are in a first position or a second position, the system comprising:

an antenna loop disposed to receive an electromotive field (EMF), the antenna loop defining a plurality of contacts on one of the objects that may be closed to complete a portion of the antenna loop and opened to interrupt a portion of the antenna loop, the contact being closed by a conductor disposed on a second of the objects, wherein the conductor closes the contact only when the objects are in the first position wherein when the conductor closes the contact and the antenna receives the EMF, an activation signal is enabled; and a transponder operatively connected to the antenna loop that receives the activation signal and provides a coded signal to the antenna to indicate that the objects are in the first position.

11. The circuit of claim 10 wherein the plurality of contacts are provided on a plurality of objects with each pair of contacts being adapted to be closed by a conductor.

12. The circuit of claim 11 wherein the contacts are connected in series.

13. The circuit of claim 11 wherein the contacts are connected in parallel.

* * * * *

UNITED STATES PATENT AND TRADEMARK OFFICE
CERTIFICATE OF CORRECTION

PATENT NO. : 7,423,547 B2 Page 1 of 1
APPLICATION NO. : 11/162957
DATED : September 9, 2008
INVENTOR(S) : Slobadan Pavlovic et al.

It is certified that error appears in the above-identified patent and that said Letters Patent is hereby corrected as shown below:

Column 6, Line 28-29, Claim 2:

Delete "REID" and insert -- RFID --.

Signed and Sealed this

Second Day of December, 2008

JON W. DUDAS
*Director of the United States Patent and Trademark Office*